(12) United States Patent
Seo et al.

(10) Patent No.: US 12,027,948 B2
(45) Date of Patent: Jul. 2, 2024

(54) TERMINAL BLOCK FOR MOTOR

(71) Applicant: HYUNDAI MOBIS CO., LTD., Seoul (KR)

(72) Inventors: Yeong Woo Seo, Yongin-si (KR); Yul Kyu Son, Yongin-si (KR); Hye Seong Yang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 142 days.

(21) Appl. No.: 17/576,372

(22) Filed: Jan. 14, 2022

(65) Prior Publication Data

US 2022/0247265 A1 Aug. 4, 2022

(30) Foreign Application Priority Data

Jan. 29, 2021 (KR) .................. 10-2021-0013608

(51) Int. Cl.
*H02K 5/22* (2006.01)
*H01R 9/24* (2006.01)

(52) U.S. Cl.
CPC .............. *H02K 5/225* (2013.01); *H01R 9/24* (2013.01)

(58) Field of Classification Search
CPC ............ H02K 3/50; H02K 3/52; H02K 3/521; H02K 3/522; H02K 5/22; H02K 5/225; H02K 2203/06; H02K 2203/09; H01R 9/223; H01R 9/226; H01R 9/24; H01R 9/2408; H01R 9/2491

USPC .......................................................... 310/71
See application file for complete search history.

(56) References Cited

U.S. PATENT DOCUMENTS

| | | | | |
|---|---|---|---|---|
| 2006/0091746 | A1* | 5/2006 | Takeuchi | H02K 3/522 |
| | | | | 310/67 R |
| 2014/0370737 | A1* | 12/2014 | Okayasu | H01R 13/4223 |
| | | | | 439/357 |
| 2018/0320583 | A1* | 11/2018 | Sasaki | F04D 25/0693 |
| 2019/0006905 | A1* | 1/2019 | Lindwurm | H02K 3/522 |
| 2020/0014270 | A1* | 1/2020 | Osumi | H02K 3/50 |
| 2020/0106198 | A1* | 4/2020 | Seo | H01R 9/24 |
| 2020/0195083 | A1* | 6/2020 | Ueno | H02K 7/083 |
| 2021/0194308 | A1* | 6/2021 | Jones | H02K 3/50 |
| 2023/0058881 | A1* | 2/2023 | Asakura | H02K 9/19 |

FOREIGN PATENT DOCUMENTS

WO WO-2021136952 A1 * 7/2021 ............. H02K 9/19

* cited by examiner

*Primary Examiner* — Eric Johnson
(74) *Attorney, Agent, or Firm* — NSIP Law

(57) ABSTRACT

A terminal block for a motor, which is configured to connect a motor and an external power source to each other, includes: terminal members spaced apart from one another; and a holder comprising insulation parts spaced apart from one another and configured to respectively surround the terminal members, and a base block supported on a subject and configured to connect the insulation parts to one another.

11 Claims, 9 Drawing Sheets

TERMINAL BLOCK FOR MOTOR

CROSS-REFERENCE TO RELATED APPLICATIONS

This application claims the benefit under 35 U.S.C. § 119(a) of Korean Patent Application No. 10-2021-0013608 filed on Jan. 29, 2021 in the Korean Intellectual Property Office, the entire disclosure of which is incorporated herein by reference for all purposes.

TECHNICAL FIELD

The present disclosure relates to a terminal block for a motor, and more particularly, to a terminal block for a motor which is capable of ensuring electrical insulation performance and improving safety and reliability.

BACKGROUND ART

A hybrid vehicle or an electric vehicle, which is called an environmentally friendly vehicle, generates driving power using an electric motor (hereinafter, referred to as a 'drive motor') that obtains rotational force from electrical energy.

In general, the drive motor includes a stator coupled to a housing, and a rotor rotatably disposed in the stator with a predetermined air gap from the stator.

The stator includes stator cores provided by stacking electrical steel sheets, and stator coils wound around the stator cores.

A busbar is provided at an upper side (or a lower side) of the stator, and the stator coil is connected to an external power source through the busbar.

The busbar may be structured to include a plurality of terminals inside a ring-shaped holder, and the terminals may be constituted as a combination of phase terminals connected to U-phase, V-phase, and W-phase power sources, and a neutral terminal that connects the phase terminals.

Meanwhile, the busbar may be electrically connected, by means of a terminal block, to a connector (e.g., a high-voltage connector) to which an external power source is connected.

The terminal block may include a plurality of terminal members, and a holder (made of an insulating material) that surrounds the plurality of terminal members in an integrated manner.

However, in the related art, the plurality of terminal members, which constitutes the terminal block, is supported by a holder configured as a unitary body, which makes it difficult to ensure a sufficient creeping distance between the terminal members and degrades safety and reliability.

In particular, because intervals between the terminal members are filled with the insulating material in the related art, the creeping distance between the terminal members is difficult to ensure, which makes it difficult to ensure electrical insulation performance.

In addition, since the intervals between the terminal members are filled with the insulating material in the related art, the costs increase because of an increase in the use of the insulating material, and the time required to cure the insulating material increases, which causes a problem of deterioration in manufacturing efficiency.

Therefore, recently, various studies have been conducted to simplify the structure of the terminal block and the process of manufacturing the terminal block while ensuring the insulation performance of the terminal block, but the study results are still insufficient. Accordingly, there is a need to develop a technology to simplify the structure of the terminal block and the process of manufacturing the terminal block while ensuring the insulation performance of the terminal block.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a terminal block for a motor, which is configured to connect a motor and an external power source to each other, includes: terminal members spaced apart from one another; and a holder comprising insulation parts spaced apart from one another and configured to respectively surround the terminal members, and a base block supported on a subject and configured to connect the insulation parts to one another.

The base block may be configured to partially surround the insulation parts.

The insulation parts may be integrally connected to the base block by insert injection molding.

The terminal block may further include a bushing disposed on the base block.

The terminal block may further include a nut disposed at an end of each of the terminal members and exposed to an outside.

A nut hole may be disposed at the end of each of the terminal members, and the nut is press-fitted into the nut hole.

The terminal block may further include a support part disposed on the base block and configured to support the base block on the subject.

The support part may be accommodated in a support groove disposed in the subject.

The support part may include: a first support protrusion connected to the base block and accommodated in the support groove; and a second support protrusion connected to the base block, spaced apart from the first support protrusion, and accommodated in the support groove.

The first support protrusion may have a form of a ring having a first diameter, and the second support protrusion may have a form of a ring having a second diameter larger than the first diameter.

The first and second support protrusions may be configured to be in elastic contact with an inner wall surface of the support groove.

Each terminal member among the terminal members may include: a terminal body; a first terminal part bent from one end of the terminal body and configured to be electrically connected to the motor; and a second terminal part bent from another end of the terminal body and configured to be electrically connected to the external power source.

The terminal block may further include: an exposing portion disposed in an insulation part, among the insulation parts, and configured to expose a part of a surface of a respective terminal member, among the terminal members, to an outside of the insulation part.

A creeping distance between adjacent terminal members among the terminal members may be 4 mm or more. A straight distance Y from a surface of the base block to the exposing portion may satisfy Y>H/2, wherein H is a straight length from the surface of the base block to an outermost peripheral end of the insulation part.

Other features and aspects will be apparent from the following detailed description, the drawings, and the claims.

DETAILED DESCRIPTION

Figure 1:
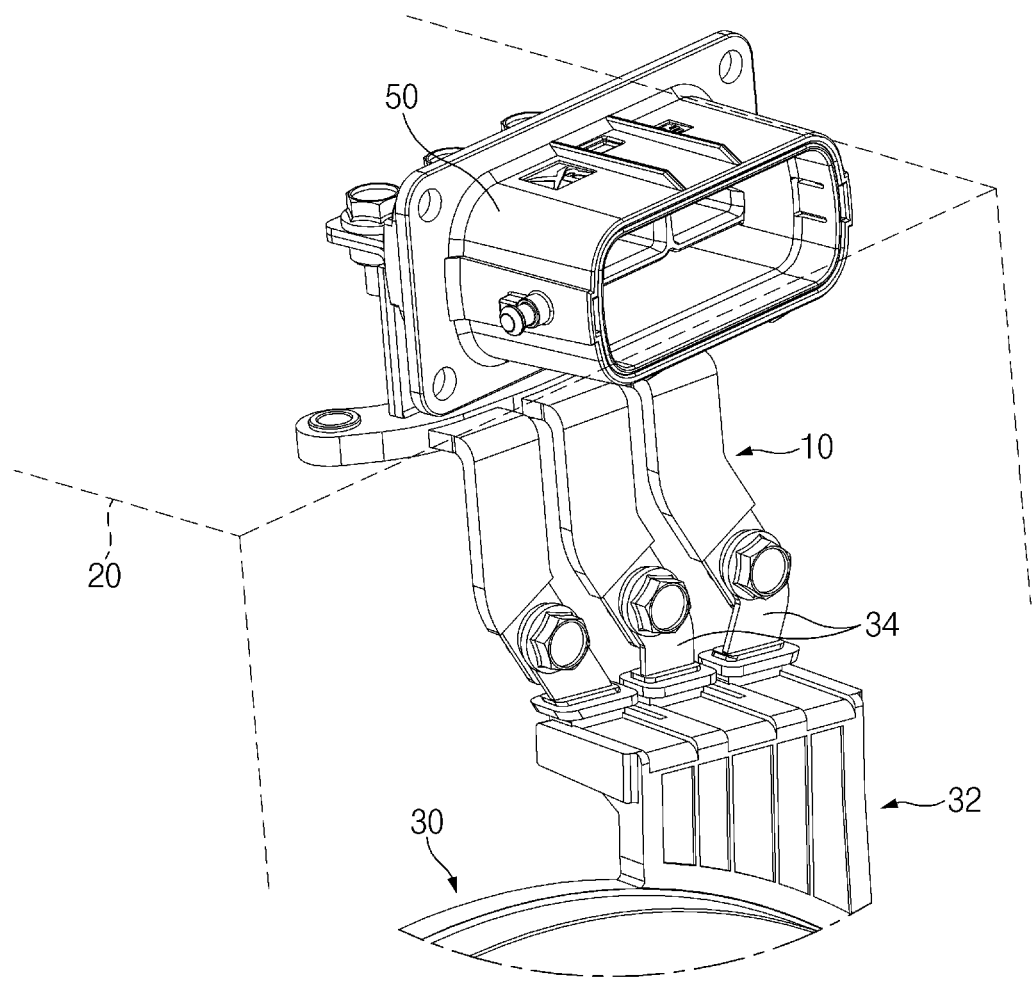
FIG. 1 is a view for explaining an example in which a terminal block for a motor according to an embodiment of the present disclosure is mounted.

Hereinafter, exemplary embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 9, a terminal block 10 for a motor according to an embodiment of the present disclosure includes: a plurality of terminal members 100 configured to electrically connect a motor 30 and an external power source and spaced apart from one another; and a holder 200 including a plurality of insulation parts 210 spaced apart from one another and configured to respectively surround the terminal members 100, and a base block 220 supported on a subject 20 and configured to connect the plurality of insulation parts 210.

For reference, the terminal block 10 for a motor according to the embodiment of the present disclosure may be used to electrically connect the motor 30 to a connector 50 (e.g., a high-voltage connector) to which the external power source is connected.

The motor 30 to which the terminal block 10 for a motor according to the embodiment of the present disclosure is connected may be variously changed in type and structure in accordance with required conditions and design specifications. The present disclosure is not restricted or limited by the type and structure of the motor 30.

For example, the motor 30, to which the terminal block 10 according to the embodiment of the present disclosure is applied, may be used as a drive motor for an environmentally friendly vehicle, such as a hybrid vehicle and/or an electric vehicle, which obtains driving power from electrical energy.

For example, the drive motor 30 is an inner-rotor-type synchronous motor 30 and may include a stator (not illustrated) installed in a motor housing (not illustrated) and a rotor (not illustrated) rotatably installed in the stator with a predetermined air gap between the stator and the rotor. The terminal block 10 for a motor according to the embodiment of the present disclosure may be connected to a busbar 32 connected to a coil of the stator.

The stator may be accommodated in the housing (not illustrated), and a coil (not illustrated) configured to induce an electrical interaction between the stator and the rotor is wound around the stator.

For example, the stator may include a stator core (not illustrated) including a plurality of teeth. The stator core may have an annular yoke (not illustrated) and the teeth (not illustrated) around which the coil is wound in a direction from the yoke to a center of the stator core. Further, the stator core may be made by stacking a plurality of plates each provided in the form of a thin steel sheet. In addition, the stator core may be provided by coupling or connecting a plurality of split cores.

The rotor is rotated by the electrical interaction between the stator and the rotor.

As an example, the rotor may include a rotor core (not illustrated) and magnets (not illustrated). The rotor core may have a structure made by stacking a plurality of circular plates each provided in the form of a thin steel sheet or be provided in the form of a bin.

A hole (not illustrated) may be formed at a center of the rotor, and a shaft may be coupled to the hole. Protrusions (not illustrated) may protrude from an outer peripheral surface of the rotor core and guide the magnets. The magnets may be attached to the outer peripheral surface of the rotor core and spaced apart from one another at predetermined intervals in a peripheral direction of the rotor core.

In addition, the rotor may include a can member (not illustrated) configured to surround the magnets and inhibit the separation of the magnets.

Referring to FIGS. 1 to 4, the terminal block 10 for a motor includes the plurality of terminal members 100 spaced apart from one another.

One end of the terminal member 100 may be electrically connected (e.g., by means of a connecting bolt) to a busbar terminal 34 of the busbar 32, and the other end of the terminal member 100 may be electrically connected (e.g., by means of a connecting bolt) to the connector 50 to which the external power source is connected.

Hereinafter, an example will be described in which the terminal block 10 for a motor includes three terminal members 100 spaced apart from one another. According to another embodiment of the present disclosure, the terminal block 10 for a motor may include one or two terminal members 100.

More specifically, the terminal block 10 for a motor may include a first terminal member (not illustrated) configured to receive U-phase power, a second terminal member (not illustrated) spaced apart from the first terminal member and configured to be supplied with V-phase power, and a third terminal member (not illustrated) spaced apart from the second terminal member and configured to be supplied with W-phase power.

The terminal member 100 may have various structures capable of electrically connecting the motor 30 and the connector 50. The present disclosure is not restricted or limited by the structure of the terminal member 100.

In particular, the terminal member 100 may have a structure made by continuously bending a band-shaped metal member having electrical conductivity.

Figure 2:
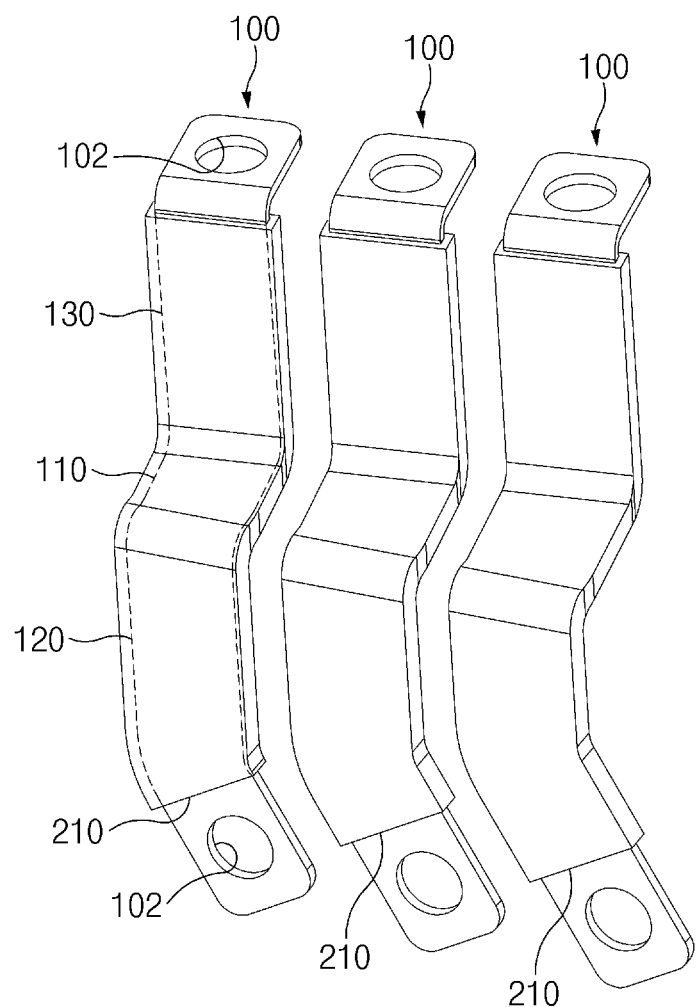
FIG. 2 is a view for explaining terminal members and insulation parts of the terminal block for a motor according to the embodiment of the present disclosure.
Figure 3:
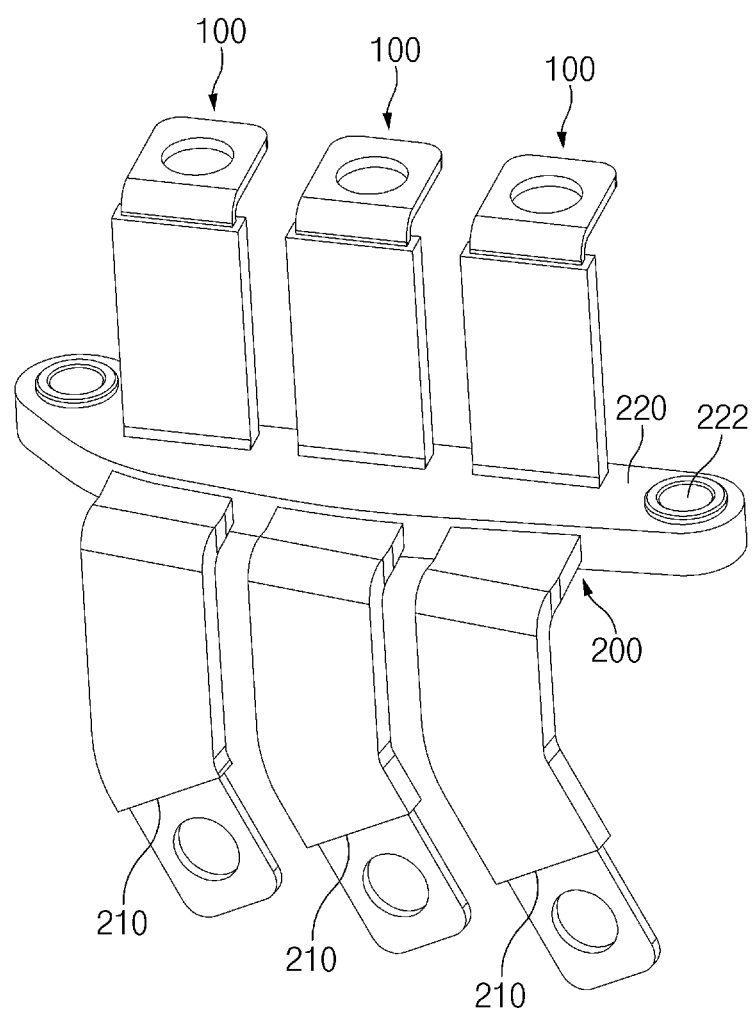
FIG. 3 is a view for explaining a base block of the terminal block for a motor according to the embodiment of the present disclosure.

For example, referring to FIG. 2, the terminal member 100 may include a terminal body 110, a first terminal part 120 bent from one end of the terminal body 110 and configured to be electrically connected to the motor 30 (e.g., the busbar terminal), and a second terminal part 130 bent from the other end of the terminal body 110 and configured to be electrically connected to the external power source (e.g., the connector).

For example, the terminal body 110 may be disposed in a horizontal direction (based on FIG. 2), the first terminal part 120 may be bent from one end of the terminal body 110 in a direction toward an upper surface (based on FIG. 2) of the terminal body 110, and the second terminal part 130 may be bent from the other end of the terminal body 110 in a direction toward a lower surface (based on FIG. 2) of the terminal body 110.

In particular, the first terminal part 120 and the terminal body 110 may collectively define an approximately "L" shape, and the second terminal part 130 and the terminal body 110 may collectively define an approximately "L" shape.

According to the exemplary embodiment of the present disclosure, the terminal block 10 for a motor may include nuts 140 disposed at ends of the terminal members 100 and exposed to the outside. The connecting bolt connected to the terminal member 100 may be fastened to the nut 140.

In particular, a nut hole 102 (see FIG. 2) may be provided at the end of the terminal member 100, and the nut 140 may be press-fitted into the nut hole 102.

A typical clinching nut (or PEM nut) capable of providing an internal thread may be used as the nut 140. The present disclosure is not restricted or limited by the type and structure of the nut 140.

According to another embodiment of the present disclosure, the nut 140 may be fixed to the terminal member 100 by welding or the like.

The holder 200 serves to support the plurality of terminal members 100 while insulating the plurality of terminal members 100 from one another.

More specifically, the holder 200 includes: the plurality of insulation parts 210 spaced apart from one another and configured to respectively surround the terminal members 100; and the base block 220 supported on the subject 20 and configured to connect the plurality of insulation parts 210.

The insulation parts 210 respectively surround the terminal members 100.

For example, the insulation part 210 may be made of a typical insulating material (e.g., epoxy) and integrally connected to the terminal member 100 by insert injection molding. According to another embodiment of the present disclosure, the insulation part 210 may be formed by applying an insulating material onto a surface of the terminal member 100 and then curing the insulating material.

In particular, the insulation part 210 may have a constant thickness as a whole. More particularly, the two opposite ends of the terminal member 100 may be exposed to the outside of the insulation part 210, the exposed portions of the terminal member 100 (the portions exposed to the outside of the insulation part 210) may be electrically connected to the busbar terminal 34 and the connector 50.

The base block 220 serves to integrally connect the plurality of insulation parts 210 spaced apart from one another and is connected to the subject 20 (e.g., the motor housing or the busbar).

The base block 220 may be made of an insulating material (e.g., epoxy) identical or similar to the insulating material of the insulation part 210. The present disclosure is not restricted or limited by the material of the base block 220.

The base block 220 may have various structures capable of integrally connecting the plurality of insulation parts 210. The present disclosure is not restricted or limited by the structure of the base block 220.

For example, the base block 220 may partially surround the plurality of insulation parts 210. Except for the portions of the insulation parts 210 where the base block 220 is formed, the remaining portions of the insulation parts 210 may be kept spaced apart from one another (in a state in which a vacant space is defined between the adjacent insulation parts 210).

In particular, the base block 220 may surround the bent portion of the terminal member 100 (e.g., the portion where the terminal body 110 and the second terminal part 130 are connected).

Since the base block 220 surrounds the bent portion of the terminal member 100 as described above, it is possible to obtain an advantageous effect of more securely fixing the base block 220 and the insulation parts 210.

In the embodiment of the present disclosure illustrated and described above, the example has been described in which the base block 220 connects the terminal bodies 110 of the terminal members 100. However, according to another embodiment of the present disclosure, the base block 220 may be configured to connect the first terminal parts 120 or the second terminal parts 130 of the terminal members 100.

According to the exemplary embodiment of the present disclosure, the plurality of insulation parts 210 may be integrally connected to the base block 220 by insert injection molding. According to another embodiment of the present disclosure, the base block 220 may be formed by using a plurality of assembling members capable of being assembled to one another.

As described above, according to the embodiment of the present disclosure, the insulation parts 210 are provided to respectively surround the plurality of terminal members 100, and the plurality of insulation parts 210 is connected by means of the base block 220. Therefore, it is possible to reduce the overall size and weight of the terminal block 10 while ensuring the electrical insulation performance.

Figure 4:
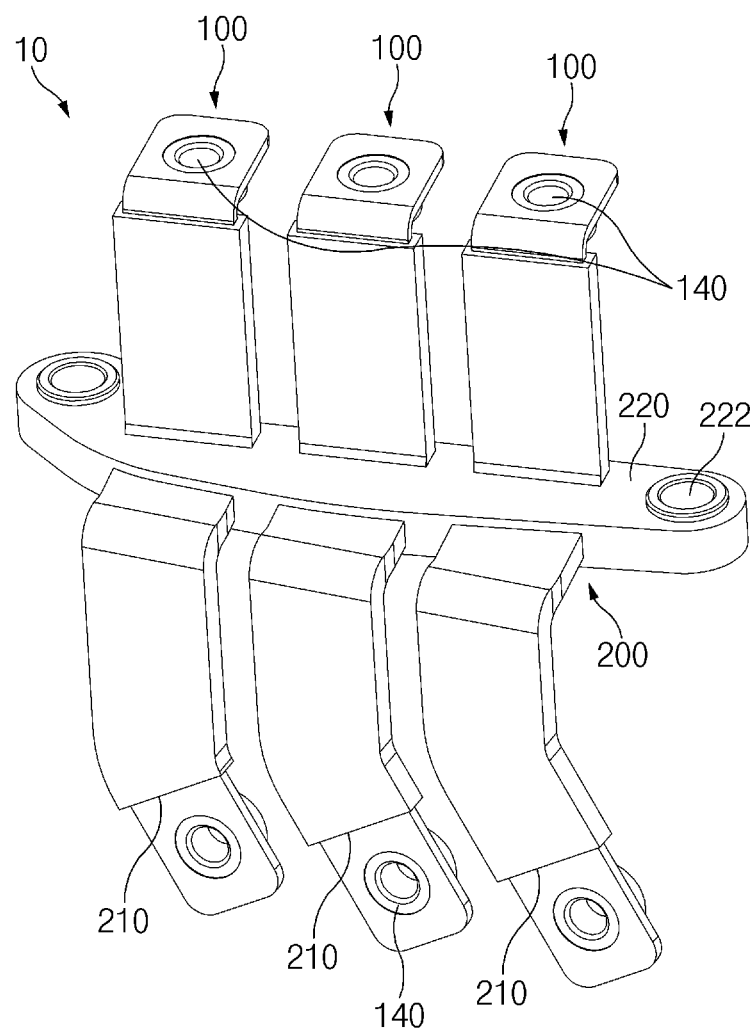
FIG. 4 is a view for explaining nuts of the terminal block for a motor according to the embodiment of the present disclosure.
Figure 8:
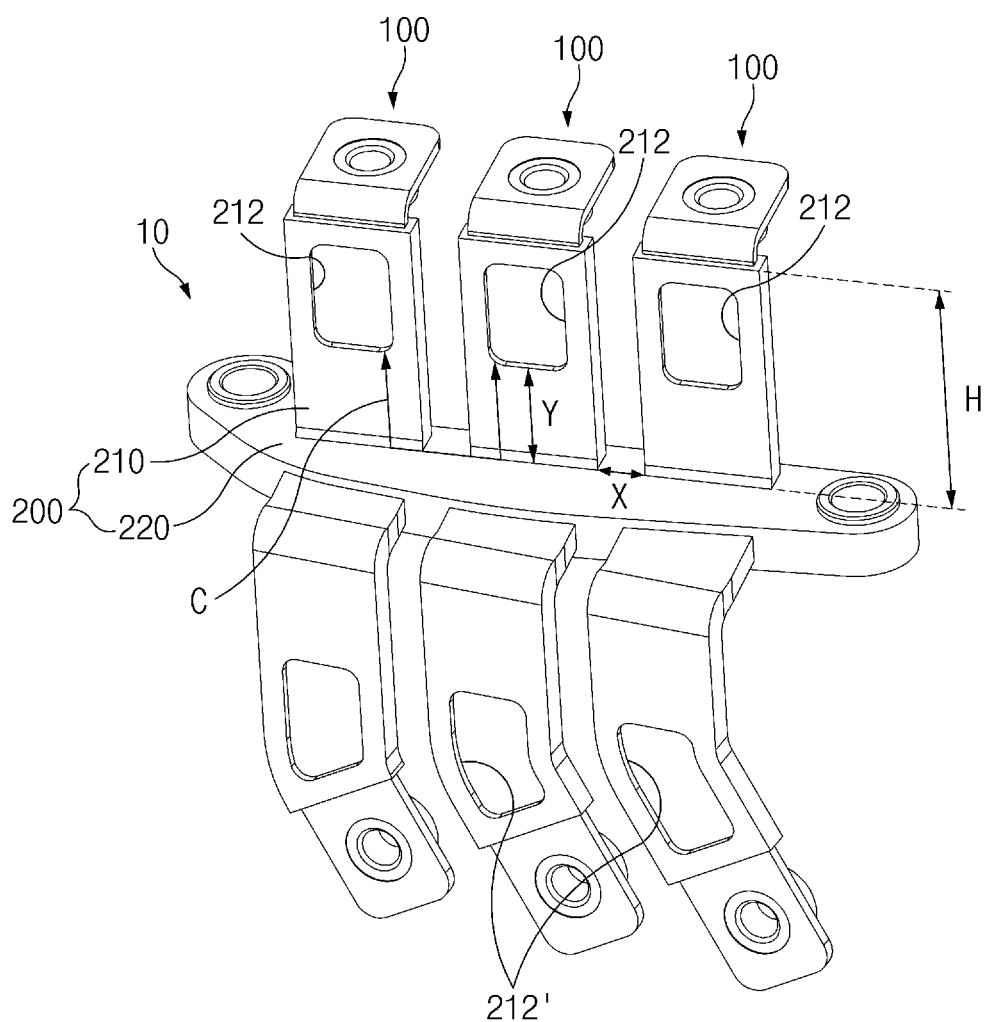
FIGS. 8 and 9 are views for explaining exposing portions of the terminal block for a motor according to the embodiment of the present disclosure.

That is, referring to FIGS. 4 and 8, the insulation parts 210 are provided to respectively surround the plurality of terminal members 100, and the plurality of insulation parts 210 is connected by means of the base block 220, such that a predetermined interval (vacant space) may be formed between the adjacent terminal members 100. Therefore, it is possible to increase a creeping distance C (see FIG. 8) between the adjacent terminal members 100.

This is based on the fact that an electric current applied to the terminal member 100 flows along the surface of the holder 200 (the insulation parts and the base block). Since the vacant space is formed between the adjacent terminal members 100, a distance (route) by which the electric current flows may be further increased. As a result, it is possible to obtain an advantageous effect of further increasing the creeping distance between the adjacent terminal members 100. Therefore, it is possible to obtain an advantageous effect of minimizing an insulation defect between the adjacent terminal members 100 and improving stability and reliability.

In addition, according to the embodiment of the present disclosure, the predetermined interval (vacant space) is formed between the adjacent terminal members 100. Therefore, it is possible to obtain an advantageous effect of reducing the amount of the insulating material used to form the holder 200, reducing the overall size and weight of the holder 200, and reducing the costs.

According to the exemplary embodiment of the present disclosure, the terminal block 10 for a motor may include bushings 222 disposed on the base block 220.

In particular, the bushings 222 may be integrated with the base block 220 by insert injection molding, and a fastening member (e.g., a bolt) (not illustrated) passing through the bushing 222 may be fastened to a fastening hole (not illustrated) formed in the subject 20.

Figure 5:
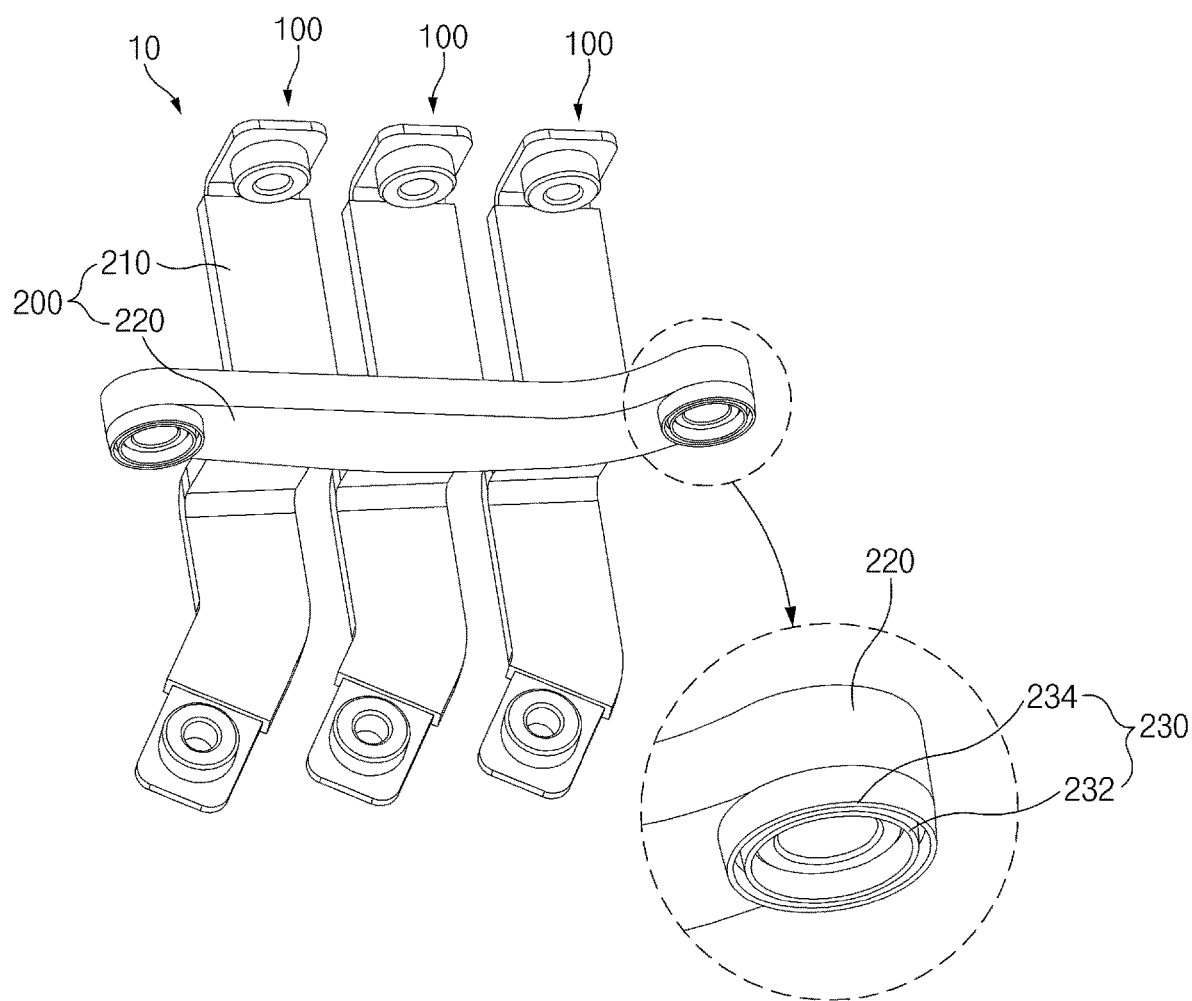
FIGS. 5 to 7 are views for explaining support parts of the terminal block for a motor according to the embodiment of the present disclosure.
Figure 6:
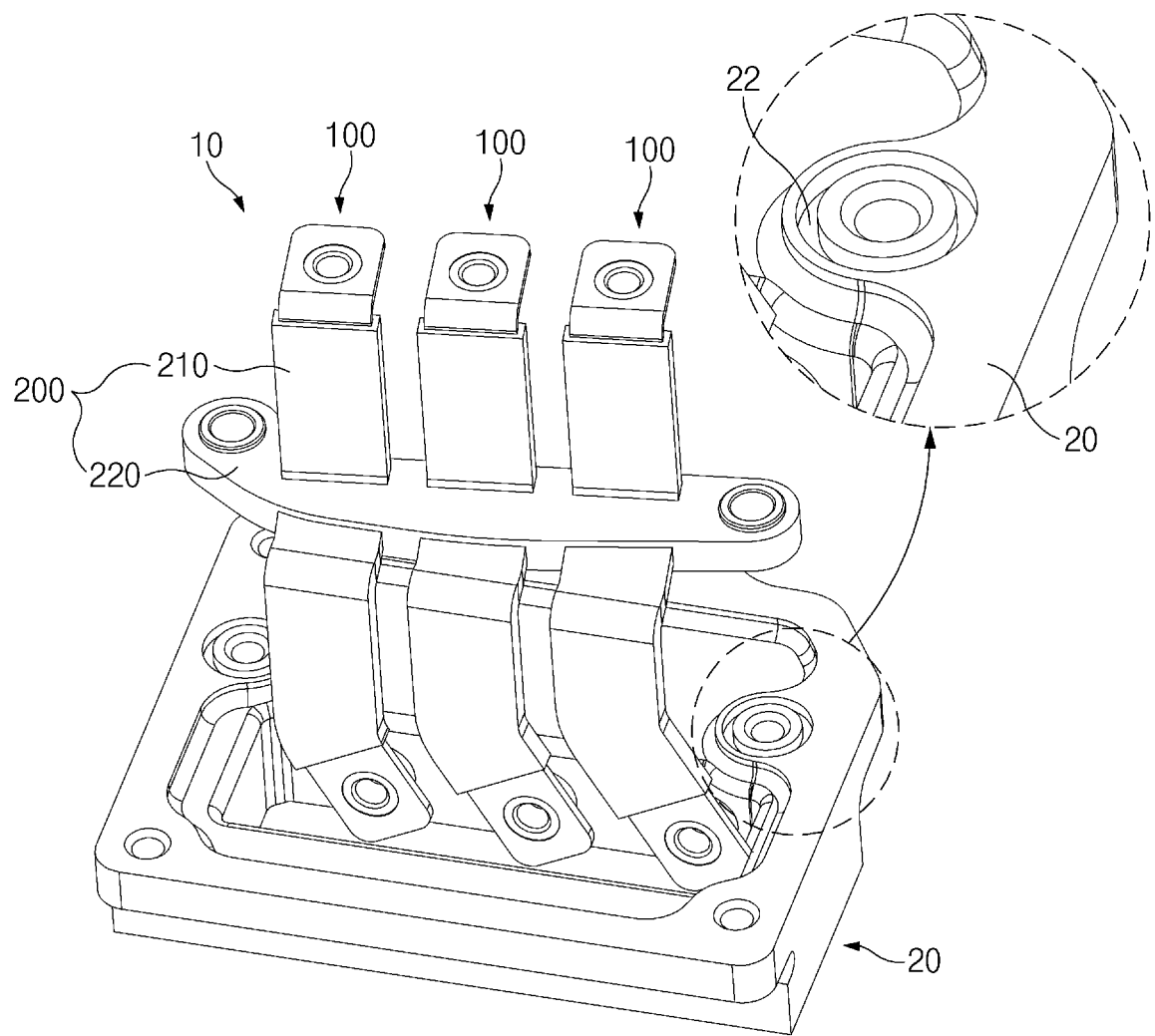
Figure 7:
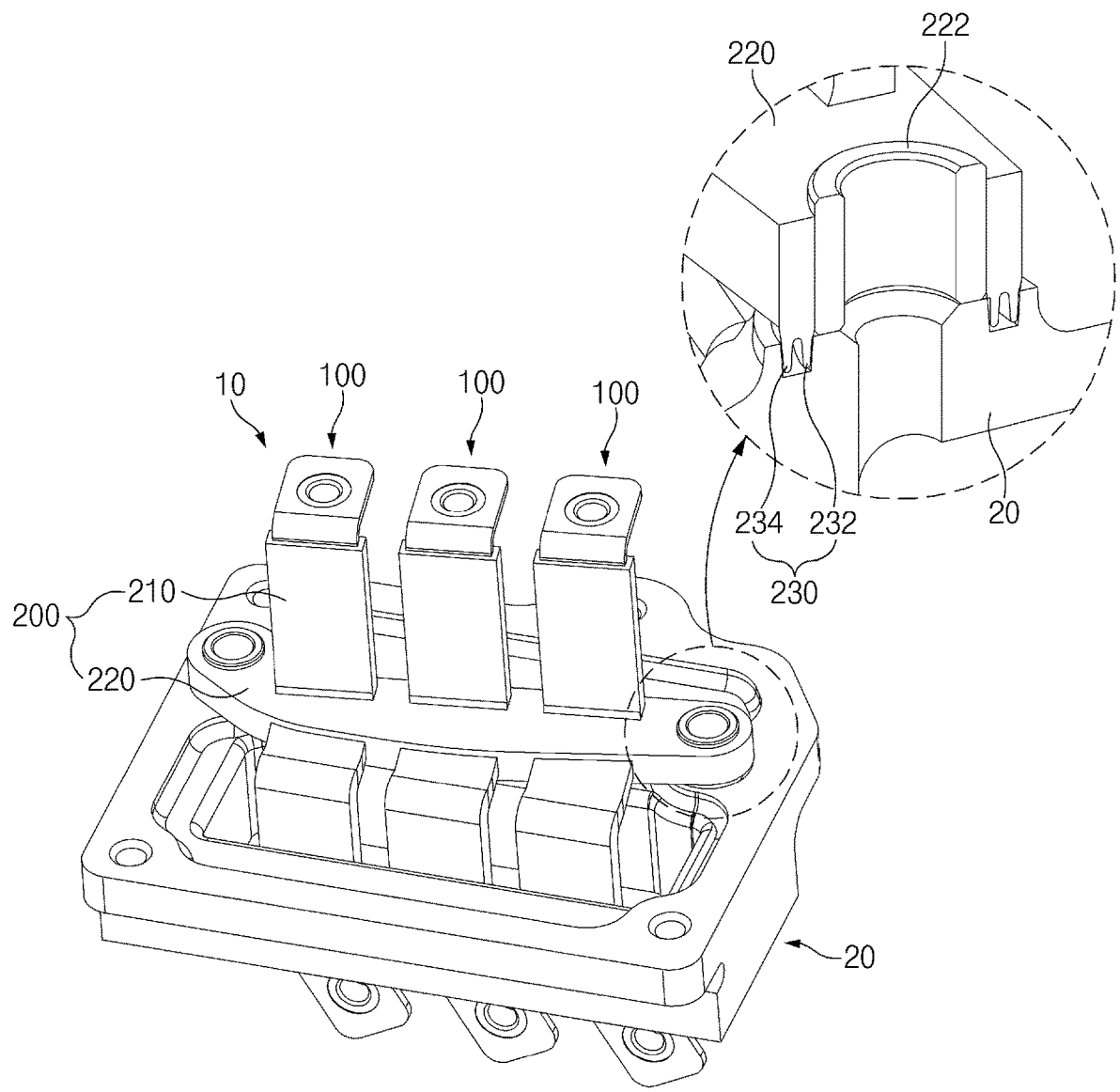

Referring to FIGS. 5 to 7, according to the exemplary embodiment of the present disclosure, the terminal block 10 for a motor may include support parts 230 disposed on the base block 220 and configured to support the base block 220 on the subject 20.

The support part 230 serves to maintain a state in which the base block 220 is disposed (seated) on the subject 20 before the base block 220 is fixed to the subject 20 (e.g., by means of the fastening member).

Since the support parts 230 maintain the state in which the base block 220 is disposed on the subject 20 as described above, it is possible to exclude a process and an operator for maintaining the state in which the base block 220 is disposed on the subject 20, at the time of assembling (fixing, by using the fastening member) the terminal block 10 for a motor to the motor 30. Therefore, it is possible to obtain an advantageous effect of simplifying the working process and improving the workability and assembly properties.

The support part 230 may have various structures capable of supporting the base block 220 on the subject 20. The present disclosure is not restricted or limited by the structure of the support part 230.

According to the exemplary embodiment of the present disclosure, the support parts 230 are accommodated in support grooves 22 provided in the subject 20, which makes it possible to maintain the state in which the base block 220 is disposed on the subject 20.

For example, the support part 230 may include a first support protrusion 232 connected to the base block 220 and configured to be accommodated in the support groove 22, and a second support protrusion 234 connected to the base block 220, spaced apart from the first support protrusion 232, and configured to be accommodated in the support groove 22.

Since the base block 220 is supported by the dual support structure using the first support protrusion 232 and the second support protrusion 234 as described above, it is possible to obtain an advantageous effect of more stably maintaining the state in which the base block 220 is disposed on the subject 20.

The first and second support protrusions 232 and 234 may have various structures capable of being accommodated in the support groove 22. The present disclosure is not restricted or limited by the structures of the first and second support protrusions 232 and 234.

For example, the first support protrusion 232 may be provided in the form of a ring having a first diameter, and the second support protrusion 234 may be provided in the form of a ring having a second diameter larger than the first diameter.

According to another embodiment of the present disclosure, the first and second support protrusions 232 and 234 may each have a circular arc shape, a column shape, or other shapes.

In particular, the first and second support protrusions 232 and 234 may be in elastic contact with an inner wall surface of the support groove 22.

For example, one end of each of the first and second support protrusions 232 and 234 is connected to the base block 220, and the other end of each of the first and second support protrusions 232 and 234 is disposed as a free end, such that the first and second support protrusions 232 and 234 may elastically move relative to the base block 220.

Since the first and second support protrusions 232 and 234 are configured to come into elastic contact with the inner wall surface of the support groove 22 as described above, it is possible to obtain an advantageous effect of minimizing swaying and motions of the base block 220 due to the manufacturing tolerance and assembly tolerance and more stably maintaining the arrangement state of the base block 220.

Figure 9:
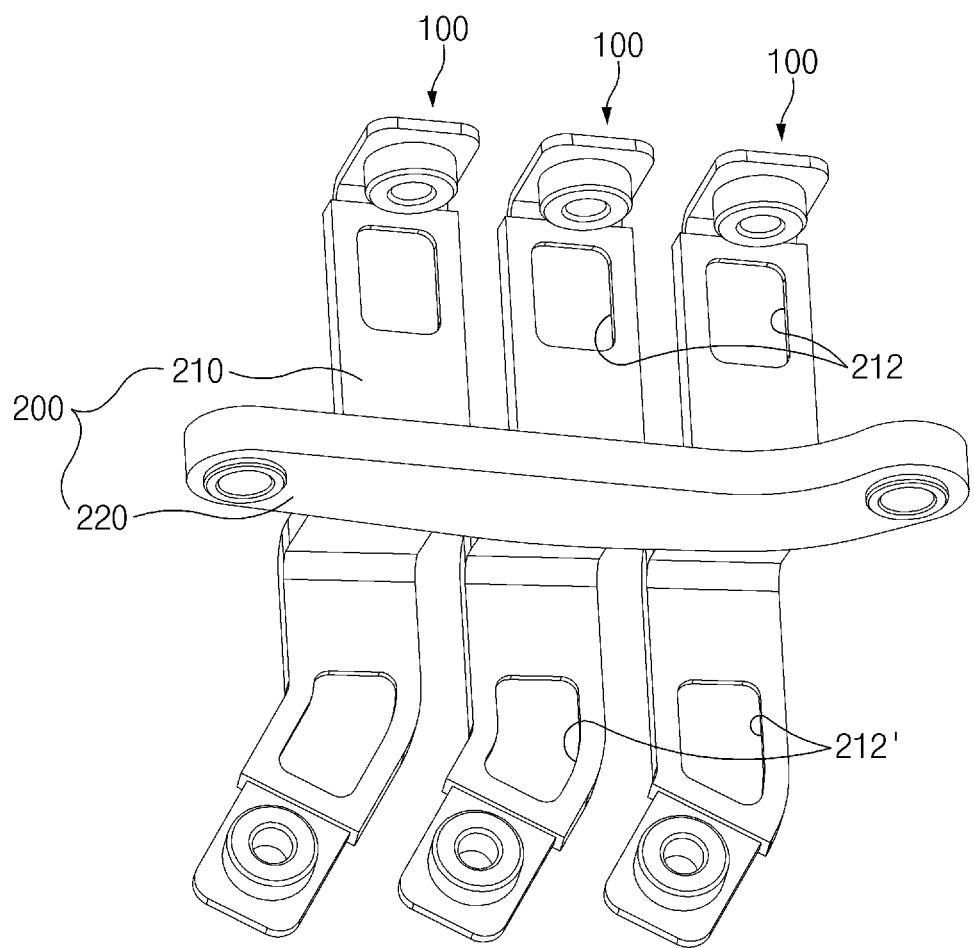

Referring to FIGS. 8 and 9, according to the exemplary embodiment of the present disclosure, the terminal block 10 for a motor may include exposing portions 212 provided in the insulation parts 210 and configured to partially expose the surfaces of the terminal members 100 to the outside of the insulation parts 210.

As described above, the exposing portion 212 may be formed in the insulation part 210, such that an exposed area of the terminal member 100 (an area of the terminal member 100 exposed to the outside of the insulation part 210) may be increased. Therefore, it is possible to obtain an advantageous effect of improving the heat dissipation performance and operational stability of the terminal member 100.

The exposing portion 212 may be formed in various ways in accordance with required conditions and design specifications.

For example, the exposing portion 212 may be formed by partially removing a part of the insulation part 210. According to another embodiment of the present disclosure, the exposing portion 212 may be formed by forming the insulation part 210 on the portions, except for a portion corresponding to the exposing portion 212, at the time of forming the insulation part 210 by injection molding.

The exposing portion 212 may have various structures capable of exposing the surface of the terminal member 100. The present disclosure is not restricted or limited by the structure and shape of the exposing portion 212.

For example, the exposing portion 212 may have an approximately quadrangular shape and be formed in each of one surface and the other surface of the insulation part 210 (e.g., the portion of the insulation part corresponding to the second terminal part). In some instances, the exposing portion 212 may have a circular shape or other shapes.

According to another embodiment of the present disclosure, an exposing portion 212' may also be formed in each of one surface and the other surface of another portion of the insulation part 210 (e.g., the portion of the insulation part 210 corresponding to the first terminal part 120).

In particular, referring to FIG. 8, the creeping distance C between the adjacent terminal members 100 may be 4 mm or more, and a straight distance Y from the surface of the base block 220 to the exposing portion 212 (a shortest distance from the surface of the base block to the exposing portion) may satisfy the flowing Expression 1.

$$Y > H/2 \quad \text{[Expression 1]}$$

(Here, H represents a straight length from the surface of the base block 220 to an outermost peripheral end of the insulation part 210.)

For example, when the straight distance Y from the surface of the base block 220 to the exposing portion 212 is 16 mm and a spacing distance X between the insulation parts 210 is 4 mm, the creeping distance C is about 38 mm (2Y+X), such that the creeping distance C may satisfy a reference creeping distance (4 mm or more), and the straight distance Y from the surface of the base block 220 to the exposing portion 212 may satisfy Expression 1 (Y=16>H/2=15).

According to the embodiment of the present disclosure described above, it is possible to obtain an advantageous effect of ensuring the electrical insulation performance and improving the safety and reliability.

In particular, according to the embodiment of the present disclosure, it is possible to obtain an advantageous effect of increasing the creeping distance between the terminal members and improving the electrical insulation performance.

In addition, according to the embodiment of the present disclosure, it is possible to obtain an advantageous effect of simplifying the structure, contributing to the reduction in weight, and reducing the costs.

In addition, according to the embodiment of the present disclosure, it is possible to obtain an advantageous effect of improving the manufacturing efficiency, minimizing the manufacturing time, and improving the productivity.

In addition, according to the embodiment of the present disclosure, it is possible to obtain an advantageous effect of improving the heat dissipation performance and the operational stability.

In addition, according to the embodiment of the present disclosure, the terminal member and the insulation part may be used as off-the-shelf products, and only the base block may be changed and manufactured in accordance with required conditions and design specifications.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A terminal block configured to connect a motor to an external power source, the terminal block comprising:
   terminal members spaced apart from each other;
   a holder comprising insulation parts spaced apart from each other and configured to surround the terminal members, and a base block supported by a subject and configured to connect the insulation parts to each other; and
   a support part disposed on the base block and configured to support the base block on the subject,
   wherein the support part is accommodated in a support groove provided in the subject, and comprises first and second support protrusions connected to the base block and spaced apart from each other.

2. The terminal block of claim 1, wherein the base block is configured to partially surround the insulation parts.

3. The terminal block of claim 2, wherein the insulation parts are integrally connected to the base block by insert injection molding.

4. The terminal block of claim 1, further comprising:
   a bushing disposed on the base block.

5. The terminal block of claim 1, further comprising:
   a nut disposed at an end of each of the terminal members and exposed to an outside.

6. The terminal block of claim 5, wherein a nut hole is disposed at the end of each of the terminal members, and the nut is press-fitted into the nut hole.

7. The terminal block of claim 1, wherein the first support protrusion has a form of a ring having a first diameter, and the second support protrusion has a form of a ring having a second diameter greater than the first diameter.

8. The terminal block of claim 1, wherein the first and second support protrusions are configured to be in elastic contact with an inner wall surface of the support groove.

9. The terminal block of claim 1, wherein each terminal member among the terminal members comprises:
   a terminal body;
   a first terminal part bent from one end of the terminal body and configured to be electrically connected to the motor; and
   a second terminal part bent from another end of the terminal body and configured to be electrically connected to the external power source.

10. The terminal block of claim 1, further comprising:
    an exposing portion disposed in each insulation part and configured to expose a part of a surface of each terminal member to an outside of each insulation part.

11. The terminal block of claim 10, wherein a creepage distance between adjacent terminal members among the terminal members is 4 mm or more, and a straight distance Y from a surface of the base block to the exposing portion satisfies $Y > H/2$, where H is a straight length from the surface of the base block to an outermost peripheral end of the insulation part.

\* \* \* \* \*